(12) United States Patent
Shioji et al.

(10) Patent No.: US 6,297,336 B1
(45) Date of Patent: Oct. 2, 2001

(54) DETERGENT BUILDER, PRODUCTION PROCESS THEREFOR, AND POLY(METH) ACRYLIC ACID (OR SALT) POLYMER AND USE THEREOF

(75) Inventors: Shorbu Shioji, Himeji; Shigeru Yamaguchi, Yao; Yoshihiro Maeda, Ibaraki, all of (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/327,627

(22) Filed: Jun. 8, 1999

(30) Foreign Application Priority Data

Jul. 2, 1998 (JP) .................................................. 10-187456

(51) Int. Cl.$^7$ .................................................. C08F 120/06
(52) U.S. Cl. ........................ 526/317.1; 524/556; 524/832
(58) Field of Search ........................ 526/317.1; 524/556, 524/832

(56) References Cited

U.S. PATENT DOCUMENTS

| 2,789,099 | 4/1957 | Rife et al. ........................... 260/29.6 |
| 5,077,361 | 12/1991 | Hughes et al. ........................ 526/233 |
| 5,216,099 | 6/1993 | Hughes et al. ........................ 526/318.2 |

FOREIGN PATENT DOCUMENTS

| 2590261 | 11/1986 | (FR) . |
| 1595688 | 8/1981 | (GB) . |
| -A-55011092 | 1/1980 | (JP) . |
| -A-61293599 | 12/1986 | (JP) . |
| -A-02034694 | 2/1990 | (JP) . |
| -A-03121101 | 5/1991 | (JP) . |
| 05086125 | 4/1993 | (JP) . |
| -A-06263803 | 9/1994 | (JP) . |

*Primary Examiner*—Helen L. Pezzuto
(74) *Attorney, Agent, or Firm*—Roylance, Abrams, Berdo & Goodman, L.L.P.

(57) ABSTRACT

The present invention provides a detergent builder and a production process therefor, which detergent builder comprises a polymer that has a narrow molecular weight distribution and is excellent both in the gelation resistance and the chelating ability, and further, the invention provides a polymer which is favorably used also for purposes other than detergent builders. The detergent builder comprises a poly (meth)acrylic acid (or salt) polymer which gives a product of 18,000 or more from the gelation resistance and the chelating ability. To produce this detergent builder, the ratio by weight of (total amount of monomer component, chain transfer agent, and polymerization initiator) to (total amount of aqueous medium) is set in the range of 46:54~66:34, and 10% or more of the aqueous medium and 0~50% (preferably 1~50%) of the chain transfer agent are beforehand charged into a reactor, and the polymerization is carried out at a reaction temperature of 50~120 ° C. while 70% or more of the monomer component, 50% or more (preferably 50~99%) of the chain transfer agent, and 80% or more of the polymerization initiator are gradually supplied to the reaction system having a temperature of 50~120 ° C.

9 Claims, No Drawings

DETERGENT BUILDER, PRODUCTION PROCESS THEREFOR, AND POLY(METH) ACRYLIC ACID (OR SALT) POLYMER AND USE THEREOF

BACKGROUND OF THE INVENTION

A. Technical Field

The present invention relates to a detergent builder, a production process therefor, and a poly(meth)acrylic acid (or salt) polymer and a use thereof.

B. Background Art

The poly(meth)acrylic acid (or salt) polymer is a useful polymer and, for example, used for detergent builders, scale inhibitors, and inorganic pigment dispersants. A typical production process therefor comprises the step of polymerizing a monomer component including a major proportion of (meth)acrylic acid (or salt) in the presence of a chain transfer agent and a polymerization initiator in an aqueous medium.

U.S. Pat. No. 2,789,099 discloses a production process for a polyacrylic acid polymer comprising the step of carrying out a polymerization reaction of an aqueous solution containing acrylic acid, a peroxide (as a polymerization initiator), and a specific copper compound and a specific alkaline-metal hypophosphite (as chain transfer agents), and sets forth an example of preferred embodiments (working example) in which raw materials are charged all at once and then heated to carry out polymerization, and further, another example in which raw materials other than the peroxide are initially charged and heated, and thereafter, the peroxide is added, while the polymerization is carried out. This prior USP exemplifies fiber-sizing agents, soil stabilizers, adhesives, and emulsifiers as uses of the polyacrylic acid polymer.

JP-A-011092/1980 discloses the use of a specific poly(meth)acrylic acid polymer (telomer compound) as an aqueous treating agent, and sets forth an example of preferred embodiments (working example) in which the telomer compound is produced by a process comprising the step of dropping an aqueous sodium persulfate solution and acrylic acid to an aqueous sodium hypophosphite solution and heating the resultant mixture.

JP-A-293599/1986 relates to a heat-resistant scale inhibitor comprising a poly(meth)acrylic acid polymer, and sets forth an example of preferred embodiments (working example) in which water is charged into a reactor and then heated, and thereafter, an aqueous acrylic acid solution, an aqueous hypophosphorous acid (or salt) solution, and an aqueous polymerization initiator solution are dropped thereto, while the polymerization is carried out, and further, another example in which a hypophosphorous acid solution is charged into a reactor and then heated, and thereafter, acrylic acid (aqueous solution) and a polymerization initiator (aqueous solution) are dropped thereto, while the polymerization is carried out.

The gelation resistance and the chelating ability are exemplified as main properties as demanded when the poly(meth)acrylic acid (or salt) polymer is, for example, used for detergent builders, inorganic pigment dispersants, and scale inhibitors. The gelation resistance is an index showing the unlikeliness of the occurrence of a phenomenon in which polycharged metal ions, such as calcium ion, present in the system, precipitates and gels due to contact with the poly(meth)acrylic acid (or salt) polymer, and it is generally assumed that the higher the molecular weight is, the lower the gelation resistance is. On the other hand, the chelating ability is an index showing the ability to chelate the polycharged metal ions, such as calcium ion, present in the system, and it is generally assumed that the higher the molecular weight is, the better the chelating ability is. Thus, there is a trade-off relation between the gelation resistance and the chelating ability with regard to the molecular weight, so it is difficult to obtain good results with regard to both the gelation resistance and the chelating ability.

Furthermore, any of the poly(meth)acrylic acids (or salts), as obtained by the processes as disclosed in the above prior art documents, has so broad a molecular weight distribution that high-molecular and low-molecular components, greatly deviating from the average molecular weight, are present, and these components are the causes to lower the gelation resistance and the chelating ability respectively.

SUMMARY OF THE INVENTION

A. Objects of the Invention

An object of the present invention is to provide a detergent builder and a production process therefor, which detergent builder comprises a poly(meth)acrylic acid (or salt) polymer that has a narrow molecular weight distribution and is excellent both in the gelation resistance and the chelating ability. In addition, another object of the present invention is to provide a poly(meth)acrylic acid (or salt) polymer which has a narrow molecular weight distribution, and is excellent both in the gelation resistance and the chelating ability, and is favorably used not only for detergent builders, but also for inorganic pigment dispersants and scale inhibitors.

B. Disclosure of the Invention

To solve the above problems, the present invention provides the following:

(1) A detergent builder, comprising a poly(meth)acrylic acid (or salt) polymer which gives a product (A×B) of 18,000 or more from the gelation resistance (A) and the chelating ability (B).

(2) A production process for a detergent builder, comprising the step of polymerizing a monomer component including a major proportion of (meth)acrylic acid (or salt) in the presence of a chain transfer agent and a polymerization initiator in an aqueous medium, thus obtaining a detergent builder including the resultant poly(meth)acrylic acid (or salt) polymer;

with the process being characterized in that:

the ratio by weight of (total amount of monomer component, chain transfer agent, and polymerization initiator) to (total amount of aqueous medium) is in the range of 46:54~66:34;

10 weight % or more of the total amount of the aqueous medium and 0~50 weight % of the total amount of the chain transfer agent are beforehand charged into a reactor; and the polymerization is carried out within the reaction temperature range of 50–120° C. while 70 weight % or more of the total amount of the monomer component, 50 weight % or more of the total amount of the chain transfer agent, and 80 weight % or more of the total amount of the polymerization initiator are gradually supplied to the reaction system having a temperature of 50~120° C.

(3) A poly(meth)acrylic acid (or salt) polymer, obtained by a process including the step of polymerizing a monomer component including a major proportion of (meth)acrylic acid (or salt) in the presence of a chain transfer agent and a polymerization initiator in an aqueous medium;

with the polymer being characterized in that:

the ratio by weight of (total amount of monomer component, chain transfer agent, and polymerization initiator) to (total amount of aqueous medium) is in the range of 46:54~66:34;

10 weight % or more of the total amount of the aqueous medium and 1~50 weight % of the total amount of the chain transfer agent are beforehand charged into a reactor; and the polymerization is carried out within the reaction temperature range of 50~120° C. while 70 weight % or more of the total amount of the monomer component, 50 weight % or more of the total amount of the chain transfer agent, and 80 weight % or more of the total amount of the polymerization initiator are gradually supplied to the reaction system having a temperature of 50~120° C.

These and other objects and the advantages of the present invention will be more fully apparent from the following detailed disclosure.

DETAILED DESCRIPTION OF THE INVENTION

The present inventors studied every production condition for the purpose of obtaining a poly(meth)acrylic acid (or salt) polymer that has a narrower molecular weight distribution than conventional ones. As a result, they found that: at first, the way to add the raw materials (monomer component, chain transfer agent, polymerization initiator, and aqueous medium), as used for the polymerization, is exemplified by a way in which the raw materials are beforehand charged into the reactor, and by a way in which the raw materials are gradually supplied after the reaction system has been heated, and among the raw materials, preferably, the aqueous medium is beforehand charged, and the monomer component, the chain transfer agent, and the polymerization initiator are gradually supplied after the heating; and further that as to the chain transfer agent, most preferably, a certain amount thereof is beforehand charged into the reactor, and the balance is gradually supplied. Next, the inventors studied about the ratio between those raw materials, and as a result, found that where deviating from the conventional range, there is the optimal range as to the ratio of (total amount of monomer component, chain transfer agent, and polymerization initiator) to (total amount of aqueous medium). Furthermore, the inventors studied in detail about factors such as reaction temperature, and as a result, completed the present invention.

Hereinafter, the present invention is described in detail.

The monomer component, as used in the present invention, includes (meth)acrylic acid (or salt) as the major component. This inclusion as the major component means that 50 weight % or more of the monomer component is (meth)acrylic acid (or salt). Such a proportion is preferably 60 weight % or more, more preferably 90 weight % or more, still more preferably 100 weight %. The increase of the proportion of (meth)acrylic acid (or salt) in the monomer component results in the production of a polymer with high chelating ability. Examples of the (meth)acrylic acid (or salt) include: acrylic acid (or salt) monomers, such as acrylic acid, monovalent-metal acrylates (e.g. sodium acrylate, potassium acrylate), ammonium acrylate, and divalent-metal acrylates (e.g. magnesium acrylate, calcium acrylate); methacrylic acid (or salt) monomers, such as methacrylic acid, monovalent-metal methacrylates (e.g. sodium methacrylate, potassium methacrylate), ammonium methacrylate, and divalent-metal methacrylates (e.g. magnesium methacrylate, calcium methacrylate). These monomers may be used either alone respectively or in combinations with each other. Among the above exemplified ones, the acrylic acid (or salt) monomers are preferable, and acrylic acid is particularly preferable.

In the present invention, the monomer component can further include other monomers which are copolymerizable with the above (meth)acrylic acid (or salt) monomer if they do no damage to the effects of the present invention. Examples of such other monomers include: unsaturated monocarboxylic monomers, such as crotonic acid; neutralized products as obtained by partially or entirely neutralizing the above unsaturated monocarboxylic monomers, for example, with monovalent metals, divalent metals, ammonia, or organic amines; unsaturated dicarboxylic monomers, such as maleic acid, fumaric acid, itaconic acid, and citraconic acid; neutralized products as obtained by partially or entirely neutralizing the above unsaturated dicarboxylic monomers, for example, with monovalent metals, divalent metals, ammonia, or organic amines; amide monomers, such as (meth)acrylamide and t-butyl(meth) acrylamide; hydrophobic monomers, such as (meth)acrylic esters, styrene, 2-methylstyrene, and vinyl acetate; unsaturated sulfonic monomers, such as vinylsulfonic acid, allylsulfonic acid, methallylsulfonic acid, styrenesulfonic acid, 2-acrylamido-2-methylpropanesulfonic acid, 3-allyloxy-2-hydroxypropanesulfonic acid, sulfoethyl (meth)acrylate, sulfopropyl (meth)acrylate, 2-hydroxysulfopropyl (meth) acrylate, and sulfoethylmaleimide; neutralized products as obtained by partially or entirely neutralizing the above unsaturated sulfonic monomers, for example, with monovalent metals, divalent metals, ammonia, or organic amines; hydroxyl-group-containing unsaturated monomers, such as 3-methyl-2-buten-1-ol (prenol), 3-methyl-3-buten-1-ol (isoprenol), 2-methyl-3-buten-2-ol (isoprene alcohol), 2-hydroxyethyl (meth)acrylate, polyethylene glycol mono (meth)acrylate, polypropylene glycol mono(meth)acrylate, polyethylene glycol monoisoprenol ether, polypropylene glycol monoisoprenol ether, polyethylene glycol monoallyl ether, polypropylene glycol monoallyl ether, glycerol monoallyl ether, α-hydroxyacrylic acid, N-methylol(meth) acrylamide, glycerol mono(meth)acrylate, and vinyl alcohol; cationic monomers, such as dimethylaminoethyl (meth) acrylate and frdimethylaminopropyl(meth)acrylamide; nitrile monomers, such as (meth)acrylonitrile; phosphorus-containing monomers, such as (meth) acrylamidomethanephosphonic acid, methyl (meth) acrylamidomethanephosphonate, and 2-(meth)acrylamido-2-methylpropanephosphonic acid. These monomers may be used either alone respectively or in combinations with each other. The amount of these monomers, as used, is usually 50 weight % or less, preferably 40 weight % or less, more preferably 10 weight % or less, still more preferably 0 weight %, of the monomer components.

Incidentally, the "monomer component" in the present invention, in principle, means each monomer component as above. However, for example, when 1 mol of acrylic acid and 1 mol of sodium hydroxide are used, 1 mol of sodium acrylate is formed by neutralization, so this sodium acrylate is referred to as the monomer component. In addition, when 1 mol of acrylic acid and 0.5 mol of sodium hydroxide are used, a mixture of 0.5 mol of acrylic acid and 0.5 mol of sodium acrylate is formed by neutralization, so this mixture is referred to as the monomer component.

Specific examples of the polymerization initiator, as used in the present invention, include: hydrogen peroxide; persulfates, such as ammonium persulfate, sodium persulfate, and potassium persulfate; azo compounds, such as 2,2'-azobis(2-amidinopropane) dihydrochloride, 4,4'-azobis (4-cyanovaleric acid), 2,2'-azobisisobutyronitrile, and 2,2'-azobis (4-methoxy-2,4-dimethylvaleronitrile); organic peroxides, such as benzoyl, peroxide, lauroyl peroxide, peracetic acid, persuccinic acid, di-t-butyl peroxide, t-butyl hydroperoxide, and cumene hydroperoxide; but there is no especial limitation. These polymerization initiators may be used either alone respectively or in combinations with each other. Among them, the use of the persulfate is particularly preferable. The amount of the polymerization initiator, as used, relative to the monomer component, is not especially limited, but is fitly in the range of 0.0001~0.05 mol per 1 mol of the monomer component. Incidentally, the polymerization can be promoted by using a reductant, such as (bi)sulfite or transition metal salt, jointly with the above polymerization initiator.

Specific examples of the chain transfer agent, as used in the present invention, include: sulfur-containing compounds, such as thioglycolic acid, thioacetic acid, and mercaptoethanol; phosphorous compounds, such as phosphorous acid and sodium phosphite; hypophosphorous compounds, such as hypophosphorous acid and sodium hypophosphite; alcoholic compounds, such as methanol, ethanol, isopropyl alcohol, and butanol; but there is no especial limitation. These chain transfer agents 99148 may be used either alone respectively or in combinations with each other. Among the above exemplified ones, the hypophosphorous compounds are preferable, and sodium hypophosphite is particularly preferable. The amount of the chain transfer agent, as used, relative to the monomer component, is not especially limited, but is fitly in the range of 0.005~0.15 mol per 1 mol of the monomer component.

Examples of the aqueous medium, as used in the present invention, include: water alone; mixed solutions of water and water-soluble solvents. Examples of the water-soluble solvent include: lower alcohols, such as methanol, ethanol, isopropyl alcohol, and butanol; lower ketones, such as acetone and methyl ethyl ketone; lower ethers, such as dimethyl ether and methyl ethyl ether. The ratio of water in the mixed solution is preferably 40 weight % or more, and water alone is particularly preferable. Incidentally, as to the "aqueous medium" in the present invention, the calculation is carried out on the premise that all components that are other than the monomer component, the chain transfer agent, and the polymerization initiator and dissolved in water are also included in the aqueous medium. For example, when 1 mol of sodium hydroxide is used per 0.5 mol of acrylic acid, 0.5 mol of sodium acrylate is formed by neutralization, and 0.5 mol of sodium hydroxide is left. This 0.5 mol of sodium hydroxide is still dissolved in water, so the calculation is carried out with the 0.5 mol of sodium hydroxide included in the aqueous medium. In addition, the calculation is carried out on the premise that water as formed by neutralization of acrylic acid with sodium hydroxide or the like is also included in the "aqueous medium." Incidentally, when the hydrate of sodium hypophosphite is used as the chain transfer agent, the calculation is carried out with the hydrating water included in the chain transfer agent.

In the present invention, the ratio by weight of (total amount of monomer component, chain transfer agent, and polymerization initiator) to (total amount of aqueous medium) needs to be in the range of 46:54~66:34, and is preferably in the range of 48:52~64:36, more preferably 50:50~60:40. In the case where the ratio is less than 46:54, the polymer giving a large product (A×B) from the gelation resistance (A) and the chelating ability (B) in the present invention is not obtainable, and further, the polymer having a narrow molecular weight distribution is not obtainable, either. In the case where the ratio is more than 66:34, the deterioration of the production efficiency might be brought about, for example, because the polymerization time might need to be extended.

In the present invention, 10 weight % or more of the total amount of the aqueous medium needs to beforehand be charged into a reactor, and this ratio is preferably at least 15 weight %, and more preferably at least 20 weight %. In other words, it is permissible that 90 weight % or less of the aqueous medium is not beforehand charged into a reactor, but gradually supplied to the reaction system. Water, as mainly used to dissolve the monomer component, the chain transfer agent, and the polymerization initiator, corresponds to the aqueous medium as gradually supplied. In the case where the amount of the aqueous medium, as beforehand charged into a reactor, is smaller than 10 weight %, the polymer having a narrow molecular weight distribution is not obtainable.

In addition, 70 weight % or more of the total amount of the monomer component and 80 weight % or more of the total amount of the polymerization initiator need to gradually be supplied to the reaction system having a temperature of 50~120° C., and these ratios are preferably 85 weight % or more of the monomer component and 90 weight % or more of the polymerization initiator, and more preferably, 90 weight % or more of the monomer component and 95 weight % or more of the polymerization initiator. In other words, 30 weight % or less of the monomer component and 20 weight % or less of the polymerization initiator may beforehand be charged into a reactor. In the case where the amount of the monomer component, as gradually supplied, is smaller than 70 weight % or where the amount of the polymerization initiator, as gradually supplied, is smaller than 80 weight %, the polymer having a narrow molecular weight distribution is not obtainable, and further, a large amount of polymerization initiator needs to be used.

Furthermore, as to the chain transfer agent, when the resulting polymer is used for detergent builders, 0~50 weight % (preferably 1~50 weight %) of the total amount of the chain transfer agent needs to beforehand be charged into a reactor, and 50 weight % or more (preferably 50~99 weight %) of the total amount of the chain transfer agent needs to gradually be supplied to the reaction system having a temperature of 50~120° C. In addition, when the resulting polymer is used for purposes other than detergent builders (e.g. for inorganic pigment dispersants or scale inhibitors), 1~50 weight % of the total amount of the chain transfer agent needs to beforehand be charged into a reactor, and 50~99 weight % of the total amount of the chain transfer agent needs to gradually be supplied. In the case where the amount of the chain transfer agent, as gradually supplied, is smaller than 50 weight %, the polymer having a narrow molecular weight distribution is not obtainable, and a large amount of chain transfer agent needs to be used. In addition, if part (50 weight or less, or when the polymer is used for purposes other than detergent builders, 1~50 weight %) of the chain transfer agent is beforehand charged into a reactor, the molecular weight distribution of the resulting polymer can be more narrowed, and the amount of the chain transfer agent as used can be more saved, when compared with the case where the entirety of the chain transfer agent is gradually supplied. Not only when the polymer is used for detergent builders, but also when the polymer is used for other purposes, as to the chain transfer agent, it is preferable that 5~45 weight %, particularly, 10~30 weight %, of the total amount is beforehand charged into a reactor, and that 55~95 weight %, particularly, 70~90 weight %, of the total amount is gradually supplied.

In the present invention, the beforehand charging of the raw materials (monomer component, chain transfer agent, polymerization initiator, and aqueous medium) into a reactor means that the raw materials are charged into a reactor before the reaction system is heated. On the other hand, it is important that the temperature at which the raw materials are gradually supplied is in the range of 50~120° C., and this temperature is preferably in the range of 60~115° C., more preferably 90~110° C. In the case where the temperature is lower than 50° C., superhigh molecular components are formed, so the gelation resistance is greatly deteriorated. In the case where the temperature is higher than 120° C., superlow molecular components are formed, so no polymer with high chelating ability is obtainable. The method to gradually supply the raw materials to the reaction system may be either continuous or intermittent supply.

When the aimed poly(meth)acrylic acid (or salt) polymer is a poly(meth)acrylic salt, a process, in which the polymerization is carried out using a monomer component including a major proportion of (meth)acrylic acid, and the resultant polymer is neutralized with an alkali agent (such as sodium hydroxide) after the polymerization (this process might be referred to as "acid type"), is preferred to a process in which the polymerization is carried out using a (meth)acrylic salt as the monomer component (this process might be referred to as "salt type"), because the acid type process gives a polymer having a narrower molecular weight distribution than the salt type process.

The poly(meth)acrylic acid (or salt) polymer, as used in the present invention, gives a product (A×B) of 18,000 or more, preferably 30,000~250,000, more preferably 70,000~200,000, from the gelation resistance (A) and the chelating ability (B). Poly(meth)acrylic acid (or salt) polymers, giving a product (A×B) less than 18,000, merely displays insufficient performance, for example, as detergent builders, inorganic pigment dispersants, and scale inhibitors. The higher the numerical value of the product (A×B) is, the more preferable the polymer is, for example, as detergent builders, inorganic pigment dispersants, and scale inhibitors. However, in the case where the production of polymers giving a product (A×B) more than 250,000 is intended, the production efficiency tends to be low, for example, because the production time is long, or because the polymerization temperature needs to strictly be controlled. The polymer giving a product (A×B) of 18,000 or more can be produced by the above production process according to the present invention. In the case where all the above requirements of the present invention production process are not met, the polymer giving a product (A×B) of 18,000 or more is not obtainable, so the polymer displaying sufficient functions, for example, as detergent builders, inorganic pigment dispersants, and scale inhibitors, is not obtainable.

The poly(meth)acrylic acid (or salt) polymer, as used in the present invention, is not especially limited if it gives a product (A×B) of 18,000 or more, but the gelation resistance (A) is preferably at least 70, more preferably at least 80. In addition, the chelating ability (B) is preferably at least 150, more preferably at least 210.

Incidentally, the gelation resistance (A) and the chelating ability (B) are measured by measurement methods as specified in the "DETAILED DESCRIPTION OF THE PREFERRED EMBODIMENTS" portion hereof. The gelation resistance (A) has no unit, and the chelating ability (B) has the unit (mgCaCO$_3$/g).

The poly(meth)acrylic acid (or salt) polymer, as used in the present invention, has a narrow molecular weight distribution, preferably, a molecular weight distribution, as defined as (weight-average molecular weight)/(number-average molecular weight), in the range of 1.5~2.8, more preferably 1.5~1.8. Polymers, having a molecular weight distribution more than 2.8, merely provide inferior results with regard to the gelation resistance and the chelating ability. Polymers, having a molecular weight distribution less than 1.5, needs a long production time or strict polymerization temperature control, so it might not be impossible to produce such polymers at a low cost. Polymers, having a molecular weight distribution of 1.5~1.8, can easily be produced by beforehand charging part (1~50 weight %) of the chain transfer agent into a reactor in the aforementioned production process. Particularly when the polymer is used for purposes other than detergent builders (e.g. for inorganic pigment dispersants or scale inhibitors), it is desirable that the molecular weight distribution is narrow.

The weight-average molecular weight of the poly(meth)acrylic acid (or salt) polymer is preferably in the range of 1,000~100,000, more preferably 2,000~50,000. Especially, if the poly(meth)acrylic acid (or salt) polymer is derived from a monomer component including a (meth)acrylic acid (or salt) monomer in a ratio of 90 weight % or more and has a weight-average molecular weight of 1,000~100,000, and further, if the poly(meth)acrylic acid (or salt) polymer is derived from a monomer component including a (meth)acrylic acid (or salt) monomer in a ratio of 100 weight % and has a weight-average molecular weight of 2,000~50,000, then the poly(meth)acrylic acid (or salt) polymer giving a product (A×B) of 18,000 or more is easily obtainable.

In addition, when the poly(meth)acrylic acid (or salt) polymer is used for detergent builders, the weight-average molecular weight of the polymer is preferably in the range of 2,000~100,000, more preferably 3,000~10,000. When the poly(meth)acrylic acid (or salt) polymer is used for inorganic pigment dispersants, the weight-average molecular weight of the polymer is preferably in the range of 2,000~50,000, more preferably 3,000~30,000. When the poly(meth)acrylic acid (or salt) polymer is used for scale inhibitors, the weight-average molecular weight of the polymer is preferably in the range of 1,000~30,000, more preferably 2,000~10,000.

In addition, in the present invention, as is mentioned above, the poly(meth)acrylic acid (or salt) polymer is preferably produced using the hypophosphorous compound as the chain transfer agent. In such a case, the resultant polymer contains in its molecule a P atom as derived from the hypophosphorous compound.

The poly(meth)acrylic acid (or salt) polymer, according to the present invention, is usable for the same purposes as of conventional poly(meth)acrylic acid (or salt) polymers, but displays great effects when used particularly for detergent builders, inorganic pigment dispersants, and scale inhibitors.

The detergent builder, according to the present invention, comprises the above poly(meth)acrylic acid (or salt) polymer according to the present invention.

The detergent builder, according to the present invention, displays high functions even if the poly(meth)acrylic acid (or salt) polymer is used alone as the detergent builder. However, if 1~1,000 weight parts of the poly(meth)acrylic acid (or salt) polymer is used jointly with 100 weight parts of inorganic builder, particularly great effects are displayed. The use of the polymer in an amount smaller than 1 weight part, merely, displays substantially as low detergency as the use of the inorganic builder alone. In addition, even if the polymer is used in an amount larger than 1,000 weight parts, no effect rewarding the increase of the amount is expectable.

Examples of the inorganic builder, usable in the present invention, include zeolite and sodium tripolyphosphate (STPP).

The inorganic pigment dispersant, according to the present invention, comprises the above poly(meth)acrylic acid (or salt) polymer according to the present invention.

The inorganic pigment dispersant, according to the present invention, displays high functions even if the poly (meth)acrylic acid (or salt) polymer is used alone as the inorganic pigment dispersant. However, this inorganic pigment dispersant may further comprise other dispersants (e.g. organic dispersants, inorganic dispersants such as hexametaphosphoric salts and pyrophosphoric salts) if necessary. The inorganic pigment dispersant, according to the present invention, is usable to disperse inorganic pigments such as kaolin, clay, natural calcium, various calcium carbonates (which are synthetic calcium carbonates), titanium oxide, calcium sulfate, barium sulfate, satin white, iron red, zinc white, and aluminum hydroxide.

The scale inhibitor, according to the present invention, comprises the above poly(meth)acrylic acid (or salt) polymer according to the present invention.

The scale inhibitor, according to the present invention, displays high functions even if the poly(meth)acrylic acid (or salt) polymer is used alone as the scale inhibitor. However, this scale inhibitor may further comprise other additives if necessary.

The scale inhibitor, according to the present invention, can directly be added to water systems such as cooling water systems and boiler water systems. In the case where the scale inhibitor further comprises components other than the above polymer, the components of the scale inhibitor can be added separately from each other.

The scale inhibitor, according to the present invention, is usable to prevent and remove scales such as calcium carbonate, calcium phosphate, barium sulfate, calcium sulfate, calcium sulfite, calcium silicate, magnesium silicate, magnesium hydroxide, zinc hydroxide, zinc phosphate, basic zinc carbonate, silica, and iron salts. (Effects and Advantages of the Invention):

The present invention can give a poly(meth)acrylic acid (or salt) polymer that has a narrow molecular weight distribution and is excellent both in the gelation resistance and the chelating ability. The detergent builder, the inorganic pigment dispersant, and the scale inhibitor, comprising such a poly(meth)acrylic acid (or salt) polymer, display excellent effects.

DETAILED DESCRIPTION OF THE PREFERRED EMBODIMENTS

Hereinafter, the present invention is more specifically illustrated by the following examples of some preferred embodiments (working examples) in comparison with comparative examples not according to the invention. However, the invention is not limited thereto.

In the examples and the comparative examples, unless otherwise noted, the units "part(s)" and "%" denote those by weight.

The methods to measure the molecular weight, the molecular weight distribution, the gelation resistance (A), and the chelating ability (B) in the present invention are as follows.

<Molecular weight and molecular weight distribution>

As to the poly(meth)acrylic acid (or salt) polymer, the molecular weight and the molecular weight distribution (D value) were measured by GPC. The measurement conditions therefor are as follows:

pump: L-7110 (made by Hitachi Seisakusho Co., Ltd.);

carrier liquid: an aqueous solution as prepared by adding superpure water to 34.5 g of disodium hydrogenphosphate dodecahydrate and 46.2 g of sodium dihydrogenphosphate dihydrate to adjust the entirety to 5,000 g;

flow rate: 0.5 ml/min;

column: one aqueous GPC column GF-7MHQ (made by Showa Denko Co.);

detector: UV detector, wavelength 214 nm, L-7400 (made by Hitachi Seisakusho Co., Ltd.);

molecular weight standard sample: sodium polyacrylate (made by Sowa Kagaku Co.).

<Method to measure the gelation resistance>

A 1% aqueous poly(meth)acrylic salt solution is prepared. An aqueous boric acid buffer solution is prepared by adding superpure water to 7.42 g of boric acid, 1.75 g of sodium chloride, and 7.63 g of sodium borate decahydrate to adjust the entirety to 1,000 g. An aqueous calcium chloride solution is prepared by adding superpure water to 0.735 g of calcium chloride dihydrate to adjust the entirety to 5,000 g.

Next, 250 g of superpure water, 10 g of the above aqueous boric acid buffer solution, 250 g of the above aqueous calcium chloride solution, and 5 g of the above 1% aqueous poly(meth)acrylic salt solution are placed into a tall beaker of 500 ml in capacity and then sufficiently mixed. Thereafter, the beaker is capped, and then placed into a thermostat (of which the internal temperature is beforehand adjusted to 90° C.), and then left stationary for 1 hour. Immediately thereafter, the resultant aqueous solution is got out of the beaker and then placed into a quartz cell of 5 cm in cell length to measure the absorbance a of the aqueous solution for the wavelength of 380 nm.

On the other hand, 500 g of superpure water, 10 g of the above aqueous boric acid buffer solution, and 5 g of the above 1% aqueous poly(meth)acrylic salt solution are placed into a tall beaker of 500 ml in capacity and then sufficiently mixed. Thereafter, the beaker is capped, and then placed into a thermostat (of which the internal temperature is beforehand adjusted to 90° C.), and then left stationary for 1 hour. Immediately thereafter, the resultant aqueous solution is got out of the beaker and then placed into a quartz cell of 5 cm in cell length to measure the absorbance b of the aqueous solution for the wavelength of 380 nm. In other words, the absorbance b in the absence of the aqueous calcium chloride solution is measured as the blank.

Then, the gelation resistance is calculated from the above absorbances a and b in accordance with the following equation:

$$\text{Gelation resistance}=1/(\text{absorbance a}-\text{absorbance b})$$

<Method to measure the chelating ability>

An amount of 50 g of 0.001 mol/L aqueous calcium chloride solution is sampled into a beaker of 100 cc in capacity, to which 10 mg of poly(meth)acrylic salt is then added. Next, the pH of the resultant aqueous solution is adjusted to 9~11 with diluted sodium hydroxide. Thereafter, under stirring, 1 ml of 4 mol/L aqueous potassium chloride solution is added as the calcium ion electrode stabilizer.

The free calcium ion is measured with an ion analyzer (EA920 model, made by OLION Co.) and a calcium ion electrode (93-20 model, made by OLION Co.) to determine by calculation the number of the milligrams of the chelated calcium ion in terms of calcium carbonate per gram of poly(meth)acrylic salt (the chelating ability). The unit of the chelating ability is "mgCaCO$_3$/g."

Synthetic examples of the poly(meth)acrylic acid (or salt) polymer are illustrated by Examples A-1~10 and Comparative Examples A-1~7 below. Incidentally, as to Examples A-1, 8, and 9 among Examples A-1~10, 1~50% of the chain transfer agent is beforehand charged into a reactor, and the balance is gradually supplied, so both the use of the resultant polymers for detergent builders and for other purposes are included in the working examples of the present invention. As to the Example A series other than Examples A-1, 8, and 9,100% of the chain transfer agent is gradually supplied, so the use of the resultant polymers for detergent builders is included in the working examples of the present invention, but the use of the resultant polymers for other purposes is not. As to the polymers resultant from Comparative Examples A-1~7, neither the use thereof for detergent builders nor for other purposes is included in the working examples of the present invention.

EXAMPLE A-1

First, 805.5 parts of ion-exchanged water and 40.1 parts of 45% aqueous sodium hypophosphite monohydrate solution were charged into a SUS316-made separable flask of 5 L in capacity as fitted with a stirrer and a condenser, and then the temperature was elevated to the boiling point (100° C.) of the system under stirring.

Thereto, the following materials were dropped from different dropping outlets respectively: 2,126.1 parts of 80% aqueous acrylic acid solution (comprising 1,700.9 parts of acrylic acid and 425.2 parts of ion-exchanged water), 112.4 parts of 15% aqueous sodium persulfate solution (comprising 16.86 parts of sodium persulfate and 95.54 parts of ion-exchanged water), and 160.2 parts of 45% aqueous sodium hypophosphite monohydrate solution (comprising 70.11 parts of sodium hypophosphite monohydrate and 90.09 parts of ion-exchanged water), wherein: the dropping periods of the 80% aqueous acrylic acid solution, the 15% aqueous sodium persulfate solution, and the 45% aqueous sodium hypophosphite monohydrate solution were 180 minutes, 185 minutes, and 180 minutes respectively; the amount of the sodium persulfate, as used, was 0.003 mol per 1 mol of the acrylic acid; the total amount of the sodium hypophosphite monohydrate, as used, was 0.036 mol per 1 mol of the acrylic acid; the ratio of (total amount of monomer component, chain transfer agent, and polymerization initiator) to (total amount of aqueous medium) was 56:44; the amount of the aqueous medium, as initially charged into the reactor, was 58% of the total amount of the aqueous medium; the amount of the sodium hypophosphite monohydrate, as initially charged into the reactor, was 20% of the total amount of the sodium hypophosphite monohydrate; and the reaction temperature was kept at the boiling point (100~105° C.) of the system during the dropping.

After the end of the dropping, the temperature was kept at the same temperature for 5 minutes to complete the aging. thus obtaining a polyacrylic acid (1).

As to the polyacrylic acid (1), the molecular weight and the molecular weight distribution (D value) were measured by the aforementioned method. Results thereof are shown in Table 1.

EXAMPLE A-2

First, 805.5 parts of ion-exchanged water was charged into the same polymerization vessel as used in Example A-1, and then the temperature was elevated to the boiling point (100° C.) of the system under stirring.

Thereto, the following materials were dropped from different dropping outlets respectively: 2,126.1 parts of 80% aqueous acrylic acid solution (comprising 1,700.9 parts of acrylic acid and 425.2 parts of ion-exchanged water), 112.4 parts of 15% aqueous sodium persulfate solution (comprising 16.86 parts of sodium persulfate and 95.54 parts of ion-exchanged water), and 250.4 parts of 45% aqueous sodium hypophosphite monohydrate solution (comprising 112.7 parts of sodium hypophosphite monohydrate and 137.7 parts of ion-exchanged water), wherein: the dropping periods of the 80% aqueous acrylic acid solution, the 15% aqueous sodium persulfate solution, and the 45% aqueous sodium hypophosphite monohydrate solution were 180 minutes, 185 minutes, and 180 minutes respectively; the amount of the sodium persulfate, as used, was 0.003 mol per 1 mol of the acrylic acid; the amount of the sodium hypophosphite monohydrate, as used, was 0.045 mol per 1 mol of the acrylic acid; the ratio of (total amount of monomer component, chain transfer agent, and polymerization initiator) to (total amount of aqueous medium) was 56:44; the amount of the aqueous medium, as initially charged into the reactor, was 55% of the total amount of the aqueous medium; and the reaction temperature was kept at the boiling point (100~105° C.) of the system during the dropping.

After the end of the dropping, the temperature was kept at the same temperature for 5 minutes to complete the aging. thus obtaining a polyacrylic acid (2).

As to the polyacrylic acid (2), the molecular weight and the molecular weight distribution (D value) were measured by the same method as of Example A-1. Results thereof are shown in Table 1.

EXAMPLE A-3

A polyacrylic acid (3) was obtained by the same polymerization as of Example A-2 except that 805.5 parts of ion-exchanged water was replaced with 1,172 parts of ion-exchanged water when initially charged. As to the polyacrylic acid (3), the molecular weight and the molecular weight distribution (D value) were measured by the same method as of Example A-1. Results thereof are shown in Table 1.

EXAMPLE A-4

A polyacrylic acid (4) was obtained by the same polymerization as of Example A-2 except that 805.5 parts of ion-exchanged water was replaced with 1,405.6 parts of ion-exchanged water when initially charged. As to the polyacrylic acid (4), the molecular weight and the molecular weight distribution (D value) were measured by the same method as of Example A-1. Results thereof are shown in Table 1.

EXAMPLE A-5

A polyacrylic acid (5) was obtained by the same polymerization as of Example A-2 except that 805.5 parts of ion-exchanged water was replaced with 305 parts of ion-exchanged water when initially charged. As to the polyacrylic acid (5), the molecular weight and the molecular weight distribution (D value) were measured by the same method as of Example A-1. Results thereof are shown in Table 1.

EXAMPLE A-6

An acrylic acid/methacrylic acid copolymer (6) was obtained by the same polymerization as of Example A-2 except that 2,126.1 parts of 80% aqueous acrylic acid solution was replaced with 2,126.1 parts of 80% aqueous solution of acrylic acid/methacrylic acid=6/4 (molar ratio). As to the acrylic acid/methacrylic acid copolymer (6), the molecular weight and the molecular weight distribution (D value) were measured by the same method as of Example A-1. Results thereof are shown in Table 1.

EXAMPLE A-7

First, 482.6 parts of ion-exchanged water was charged into the same polymerization vessel as used in Example A-1, and then the temperature was elevated to the boiling point (100° C.) of the system under stirring.

Thereto, the following materials were dropped from different dropping outlets respectively: 2,126.1 parts of 80% aqueous acrylic acid solution (comprising 1,700.9 parts of acrylic acid and 425.2 parts of ion-exchanged water), 112.4 parts of 15% aqueous sodium persulfate solution (comprising 16.9 parts of sodium persulfate and 95.5 parts of ion-exchanged water), 250.4 parts of 45% aqueous sodium hypophosphite monohydrate solution (comprising 112.7 parts of sodium hypophosphite monohydrate and 137.7 parts of ion-exchanged water), and 1870.2 pars of 48% aqueous sodium hydroxide solution, wherein: the dropping periods of the 80% aqueous acrylic acid solution, the 15% aqueous sodium persulfate solution, the 45% aqueous sodium hypophosphite monohydrate solution, and the 48% aqueous sodium hydroxide solution were 180 minutes, 185 minutes, 180 minutes, and 180 minutes respectively; the amount of the sodium persulfate, as used, was 0.003 mol per 1 mol of the acrylic acid; the amount of the sodium hypophosphite monohydrate, as used, was 0.045 mol per 1 mol of the acrylic acid; the amount of the sodium hydroxide, as used, was 0.95 mol per 1 mol of the acrylic acid; the ratio of (total amount of monomer component, chain transfer agent, and polymerization initiator) to (total amount of aqueous medium) was 48:52; the amount of the aqueous medium, as initially charged into the reactor, was 19% of the total amount of the aqueous medium; and the reaction temperature was kept at the boiling point (100~105° C.) of the system during the dropping.

After the end of the dropping, the temperature was kept at the same temperature for 5 minutes to complete the aging. thus obtaining a sodium polyacrylate (7). As to the sodium polyacrylate (7), the molecular weight and the molecular weight distribution (D value) were measured by the same method as of Example A-1. Results thereof are shown in Table 1.

EXAMPLE A-8

A polyacrylic acid (8) was obtained by the same polymerization as of Example A-1 except that 40.1 parts of 45% aqueous sodium hypophosphite monohydrate solution was replaced with 10.0 parts of 45% aqueous sodium hypophosphite monohydrate solution when initially charged, and that 160.2 parts of 45% aqueous sodium hypophosphite monohydrate solution was replaced with 190.3 parts of 45% aqueous sodium hypophosphite monohydrate solution when dropped. As to the polyacrylic acid (8), the molecular weight and the molecular weight distribution (D value) were measured by the same method as of Example A-1. Results thereof are shown in Table 1.

EXAMPLE A-9

A polyacrylic acid (9) was obtained by the same polymerization as of Example A-1 except that 40.1 parts of 45% aqueous sodium hypophosphite monohydrate solution was replaced with 90.1 parts of 45% aqueous sodium hypophosphite monohydrate solution when initially charged, and that 160.2 parts of 45% aqueous sodium hypophosphite monohydrate solution was replaced with 110.2 parts of 45% aqueous sodium hypophosphite monohydrate solution when dropped. As to the polyacrylic acid (9), the molecular weight and the molecular weight distribution (D value) were measured by the same method as of Example A-1. Results thereof are shown in Table 1.

EXAMPLE A-10

A polyacrylic acid (10) was obtained by the same polymerization as of Example A-2 except that 250.4 parts of 45% aqueous sodium hypophosphite monohydrate solution was replaced with 88.5 parts of 45% aqueous sodium hypophosphite monohydrate solution (comprising 37.6 parts of sodium hypophosphite monohydrate and 45.9 parts of ion-exchanged water). As to the polyacrylic acid (10), the molecular weight and the molecular weight distribution (D value) were measured by the same method as of Example A-1. Results thereof are shown in Table 1.

COMPARATIVE EXAMPLE A-1

A comparative polyacrylic acid (1) was obtained by the same polymerization as of Example A-2 except that 805.5 parts of ion-exchanged water was replaced with 1,671.2 parts of ion-exchanged water when initially charged. As to the comparative polyacrylic acid (1), the molecular weight and the molecular weight distribution (D value) were measured by the same method as of Example A-1. Results thereof are shown in Table 2.

COMPARATIVE EXAMPLE A-2

A comparative polyacrylic acid (2) was obtained by the same polymerization as of Example A-2 except that 250.4 parts of 45% aqueous sodium hypophosphite monohydrate solution was not dropped, but initially charged, in other words, a mixture of 805.5 parts of ion-exchanged water and 250.4 parts of 45% aqueous sodium hypophosphite monohydrate solution was used as the initially charged material. As to the comparative polyacrylic acid (2), the molecular weight and the molecular weight distribution (D value) were measured by the same method as of Example A-1. Results thereof are shown in Table 2.

COMPARATIVE EXAMPLE A-3

First, 805.5 parts of ion-exchanged water, 850.4 parts of 80% aqueous acrylic acid solution (40% of the entirety of the monomer), 33.7 parts of 15% aqueous sodium persulfate solution (30% of the entirety of the sodium persulfate), and 150.2 parts of 45% aqueous sodium hypophosphite monohydrate solution (60% of the entirety of the sodium hypophosphite monohydrate) were charged into the same polymerization vessel as used in Example A-1, and then the temperature was slowly elevated to the boiling point (103° C.) of the system under stirring.

Thereto, the following materials were dropped from different dropping outlets respectively: 1,275.7 parts of 80% aqueous acrylic acid solution (60% of the entirety of the monomer), 78.7 parts of 15% aqueous sodium persulfate solution (70% of the entirety of the sodium persulfate), and 100.1 parts of 45% aqueous sodium hypophosphite monohydrate solution (40% of the entirety of the sodium hypophosphite monohydrate), wherein: the dropping periods of the 80% aqueous acrylic acid solution, the 15% aqueous sodium persulfate solution, and the 45% aqueous sodium hypophosphite monohydrate solution were 180 minutes, 185 minutes, and 180 minutes respectively; the total amount of the sodium persulfate, as used, was 0.003 mol per 1 mol of the acrylic acid; the total amount of the sodium hypophosphite monohydrate, as used, was 0.045 mol per 1 mol of the acrylic acid; the ratio of (total amount of monomer component, chain transfer agent, and polymerization initiator) to (total amount of aqueous medium) was 56:44; the amount of the aqueous medium, as initially charged into the reactor, was 74% of the total amount of the aqueous medium; and the reaction temperature was kept at the boiling point (103~105° C.) of the system during the dropping.

After the end of the dropping, the temperature was kept at the same temperature for 5 minutes to complete the aging. thus obtaining a comparative polyacrylic acid (3). As to the comparative polyacrylic acid (3), the molecular weight and the molecular weight distribution (D value) were measured by the same method as of Example A-1. Results thereof are shown in Table 2.

COMPARATIVE EXAMPLE A-4

A comparative sodium polyacrylate (4) was obtained by the same polymerization as of Example A-7 except that 482.6 parts of ion-exchanged water was replaced with 922.7 parts of ion-exchanged water when initially charged. As to the comparative sodium polyacrylate (4), the molecular weight and the molecular weight distribution (D value) were measured by the same method as of Example A-1. Results thereof are shown in Table 2.

COMPARATIVE EXAMPLE A-5

A comparative sodium polyacrylate (5) was obtained by the same polymerization as of Example A-7 except that 482.6 parts of ion-exchanged water was replaced with 190.0 parts of ion-exchanged water when initially charged. As to the comparative sodium polyacrylate (5), the molecular weight and the molecular weight distribution (D value) were measured by the same method as of Example A-1. Results thereof are shown in Table 2.

COMPARATIVE EXAMPLE A-6

First, 611.5 parts of ion-exchanged water was charged into the same polymerization vessel as used in Example A-1, and then the temperature was slowly elevated to the boiling point (100° C.) of the system under stirring.

Thereto, the following materials were dropped from different dropping outlets respectively: 3,049.5 parts of 37% aqueous sodium acrylate solution and 100.1 parts of 15% aqueous sodium persulfate solution, wherein: the dropping periods of the 37% aqueous sodium acrylate solution and the 15% aqueous sodium persulfate solution were 180 minutes and 185 minutes respectively; the ratio of (total amount of monomer component, chain transfer agent, and polymerization initiator) to (total amount of aqueous medium) was 30:70; the amount of the aqueous medium, as initially charged into the reactor, was 23% of the total amount of the aqueous medium; and the reaction temperature was kept at the boiling point (100~102° C.) of the system during the dropping. After the end of the dropping, the temperature was kept at the same temperature for 5 minutes to complete the aging. thus obtaining a comparative sodium polyacrylate (6). As to the comparative sodium polyacrylate (6), the molecular weight and the molecular weight distribution (D value) were measured by the same method as of Example A-1. Results thereof are shown in Table 2.

COMPARATIVE EXAMPLE A-7

A comparative polyacrylic acid (7) was obtained by the same polymerization as of Example A-1 except that 40.1 parts of 45% aqueous sodium hypophosphite monohydrate solution was replaced with 120.2 parts of 45% aqueous sodium hypophosphite monohydrate solution when initially charged, and that 160.2 parts of 45% aqueous sodium hypophosphite monohydrate solution was replaced with 80.1 parts of 45% aqueous sodium hypophosphite monohydrate solution when dropped. As to the comparative polyacrylic acid (7), the molecular weight and the molecular weight distribution (D value) were measured by the same method as of Example A-1. Results thereof are shown in Table 2.

TABLE 1

|  | Production conditions | | | | | | | Molecular weight and molecular weight distribution | | |
| --- | --- | --- | --- | --- | --- | --- | --- | --- | --- | --- |
|  | (1) | (2) | (3) | (4) | (5) | (6) | Form | Mw | Mn | Mw/Mn |
| Example A-1 | 56:44 | 58 | 100 | 80 | 100 | 100~105 | Acid type | 6,357 | 3,739 | 1.70 |
| Example A-2 | 56:44 | 55 | 100 | 100 | 100 | 100~105 | Acid type | 5,234 | 2,829 | 1.85 |
| Example A-3 | 50:50 | 64 | 100 | 100 | 100 | 100~104 | Acid type | 5,016 | 1,929 | 2.60 |
| Example A-4 | 47:53 | 68 | 100 | 100 | 100 | 100~103 | Acid type | 4,934 | 1,787 | 2.76 |
| Example A-5 | 64:36 | 32 | 100 | 100 | 100 | 100~107 | Acid type | 6,446 | 2,518 | 2.56 |
| Example A-6 | 56:44 | 55 | 100 | 100 | 100 | 100~105 | Acid type | 5,316 | 2,291 | 2.32 |
| Example A-7 | 48:52 | 19 | 100 | 100 | 100 | 100~105 | Salt type | 5,598 | 2,195 | 2.55 |
| Example A-8 | 56:44 | 57 | 100 | 95 | 100 | 100~105 | Acid type | 6,516 | 3,640 | 1.79 |
| Example A-9 | 56:44 | 60 | 100 | 55 | 100 | 100~105 | Acid type | 6,139 | 3,355 | 1.83 |

TABLE 1-continued

| | Production conditions | | | | | | Molecular weight and molecular weight distribution | | |
|---|---|---|---|---|---|---|---|---|---|
| | (1) | (2) | (3) | (4) | (5) | (6) | Form | Mw | Mn | Mw/Mn |
| Example A-10 | 56:44 | 59 | 100 | 100 | 100 | 100~105 | Acid type | 12,156 | 4,469 | 2.72 |

(1) (Total amount of monomer component, chain transfer agent, and polymerization initiator): (total amount of aqueous medium)
(2) Amount of aqueous medium as initially charged (weight %)
(3) Amount of monomer component as dropped (weight %)
(4) Amount of chain transfer agent as dropped (weight %)
(5) Amount of polymerization initiator as dropped (weight %)
(6) Temperature of reaction system during dropping and polymerization (° C.)

TABLE 2

| | Production conditions | | | | | | | Molecular weight and molecular weight distribution | | |
|---|---|---|---|---|---|---|---|---|---|---|
| | (1) | (2) | (3) | (4) | (5) | (6) | Form | Mw | Mn | Mw/Mn |
| Comparative Example A-1 | 44:56 | 72 | 100 | 100 | 100 | 100~103 | Acid type | 4,837 | 1,602 | 3.02 |
| Comparative Example A-2 | 56:44 | 64 | 100 | 0 | 100 | 100~105 | Acid type | 8,621 | 2,550 | 3.38 |
| Comparative Example A-3 | 56:44 | 74 | 60 | 40 | 70 | 103~105 | Acid type | 12,115 | 2,912 | 4.16 |
| Comparative Example A-4 | 44:56 | 31 | 100 | 100 | 100 | 100~105 | Salt type | 5,692 | 1,830 | 3.11 |
| Comparative Example A-5 | 50:50 | 8 | 100 | 100 | 100 | 100~106 | Salt type | 6,748 | 2,032 | 3.32 |
| Comparative Example A-6 | 30:70 | 23 | 100 | 100 | 100 | 100~102 | Salt type | 6,191 | 2,098 | 2.95 |
| Comparative Example A-7 | 56:44 | 61 | 100 | 40 | 100 | 100~105 | Acid type | 6,442 | 2,651 | 2.43 |

(1) (Total amount of monomer component, chain transfer agent, and polymerization initiator): (total amount of aqueous medium)
(2) Amount of aqueous medium as initially charged (weight %)
(3) Amount of monomer component as dropped (weight %)
(4) Amount of chain transfer agent as dropped (weight %)
(5) Amount of polymerization initiator as dropped (weight %)
(6) Temperature of reaction system during dropping and polymerization (° C.)

In the following Examples A-1120 and Comparative Examples A-8~14, the measurement was made for the gelation resistance (A) and the chelating ability (B) of the polymers as obtained in Examples A-1~10 and Comparative Examples A-1~7. Any of the polymers was measured in the form of the entirely neutralized salt. The reason therefor is not that the aimed gelation resistance (A) or chelating ability (B) would not be displayed unless the polymer was in the form of the entirely neutralized salt, but is for the purpose of facilitating the comparison with each other by unifying the active components.

EXAMPLE A-11

A 48% aqueous sodium hydroxide solution was added to an aqueous solution of the polyacrylic acid (1) (as obtained in Example A-1) to adjust the pH to 9.0 to entirely neutralize the polyacrylic acid (1), thus obtaining a sodium polyacrylate (1).

The gelation resistance (A) of the sodium polyacrylate (1) was 560, and the chelating ability (B) of the sodium polyacrylate (1) was 290 mgCaCO$_3$/g. In addition, the product from the (A) and (B) was 162,400.

EXAMPLES A-12~16

The gelation resistance (A), the chelating ability (B), and the product from the (A) and (B) were determined in the same way as of Example A-11 except that poly(meth)acrylic salts (2)~(6), as prepared by entirely neutralizing the poly (meth)acrylic acids (2)~(6) (as obtained in Examples A-2~6) with sodium hydroxide, were used. Results thereof are shown in Table 3.

EXAMPLE A-17

The gelation resistance (A), the chelating ability (B), and the product from the (A) and (B) were determined in the same way as of Example A-11 except that the sodium poly(meth)acrylate (7), as obtained in Example A-7, was used. Results thereof are shown in Table 3.

EXAMPLES A-18~20

The gelation resistance (A), the chelating ability (B), and the product from the (A) and (B) were determined in the same way as of Example A-11 except that poly(meth)acrylic salts (8)~(10), as prepared by entirely neutralizing the poly (meth)acrylic acids (8)~(10) (as obtained in Examples A-8~10) with sodium hydroxide, were used. Results thereof are shown in Table 3.

COMPARATIVE EXAMPLES A-8~10

The gelation resistance (A), the chelating ability (B), and the product from the (A) and (B) were determined in the same way as of Example A-11 except that comparative poly(meth)acrylic salts (1)~(3), as prepared by entirely neutralizing the comparative poly(meth)acrylic acids (1)~(3) (as obtained in Comparative Examples A-1~3) with sodium hydroxide, were used. Results thereof are shown in Table 4.

COMPARATIVE EXAMPLES A-11~13

The gelation resistance (A), the chelating ability (B), and the product from the (A) and (B) were determined in the same way as of Example A-11 except that the comparative sodium poly(meth)acrylates (4)~(6), as obtained in Comparative Example A-4~6, was used. Results thereof are shown in Table 4.

COMPARATIVE EXAMPLE A-14

The gelation resistance (A), the chelating ability (B), and the product from the (A) and (B) were determined in the same way as of Example A-11 except that comparative poly(meth)acrylic salt (7), as prepared by entirely neutralizing the comparative poly(meth)acrylic acid (7) (as obtained in Comparative Example A-7) with sodium hydroxide, was used. Results thereof are shown in Table 4.

TABLE 3

| | Poly(meth)acrylic acid (or salt) used | Gelation resistance (A) | Chelating ability (B) | Product (A) × (B) |
|---|---|---|---|---|
| Example A-11 | Entire Na salt of polymer of Example A-1 | 560 | 290 | 162,400 |
| Example A-12 | Entire Na salt of polymer of Example A-2 | 490 | 280 | 137,200 |
| Example A-13 | Entire Na salt of polymer of Example A-3 | 220 | 270 | 59,400 |
| Example A-14 | Entire Na salt of polymer of Example A-4 | 130 | 260 | 33,800 |
| Example A-15 | Entire Na salt of polymer of Example A-5 | 320 | 290 | 92,800 |
| Example A-16 | Entire Na salt of polymer of Example A-6 | 230 | 210 | 48,300 |
| Example A-17 | Polymer of Example A-7 | 160 | 240 | 38,400 |
| Example A-18 | Entire Na salt of polymer of Example A-8 | 520 | 290 | 150,800 |
| Example A-19 | Entire Na salt of polymer of Example A-9 | 500 | 290 | 145,000 |
| Example A-20 | Entire Na salt of polymer of Example A-10 | 230 | 80 | 18,400 |

TABLE 4

| | Poly(meth)acrylic acid (or salt) used | Gelation resistance (A) | Chelating ability (B) | Product (A) × (B) |
|---|---|---|---|---|
| Comparative Example A-8 | Entire Na salt of polymer of Comparative Example A-1 | 70 | 250 | 17,500 |
| Comparative Example A-9 | Entire Na salt of polymer of Comparative Example A-2 | 45 | 280 | 12,600 |
| Comparative Example A-10 | Entire Na salt of polymer of Comparative Example A-3 | 55 | 220 | 12,100 |
| Comparative Example A-11 | Polymer of Comparative Example A-4 | 65 | 240 | 15,600 |
| Comparative Example A-12 | Polymer of Comparative Example A-5 | 32 | 290 | 9,280 |
| Comparative Example A-13 | Polymer of Comparative Example A-6 | 66 | 210 | 13,860 |
| Comparative Example A-14 | Entire Na salt of polymer of Comparative Example A-7 | 74 | 230 | 17,020 |

In the following Examples B-1~14 and Comparative Examples B-1~8, the evaluation was made for the recontamination inhibitability of the polymers as obtained in Examples A-1~10 and Comparative Examples A-1~7. As is aforementioned, as to the polymers resultant from Examples A-1~10, the use thereof for detergent builders is included in the working examples of the present invention, but as to the polymers resultant from Comparative Examples A-1~7, even the use thereof for detergent builders is not.

EXAMPLE B-1

The recontamination inhibitability of the sodium polyacrylate (1), as prepared by entirely neutralizing the polyacrylic acid (1) (as obtained in Example A-1), was measured by the following method:

<Recontamination inhibitability>

First, the following solutions were prepared:
(a) hard water: a solution as prepared by adding ion-exchanged water to 1.47 g of calcium chloride dihydrate to adjust the entirety to 5,000 g (this solution contains the calcium ion in a concentration of 200 ppm in terms of calcium carbonate;
(b) 5% aqueous sodium carbonate solution;
(c) 5% aqueous LAS (sodium salt of linear chain alkylbenzenesulfonic acid) solution;
(d) 1% aqueous sodium polyacrylate (1) solution.

One liter of the solution (a) and 1 g of clay (JIS test powder # 1.7) were placed into a pot of a Terg-O-Tometer (as adjusted to 25° C.) and then stirred at 100 rpm for 1 minute.

Next, white cotton cloth (5 cm×5 cm) was added thereto, and then stirred for 1 minute. Thereafter, 4 g of the solution (b), 4 g of the solution (c), 0.15 g of zeolite A4 powder, and 5 g of the solution (d) were added, and then the resultant mixture was stirred at 100 rpm for 10 minutes, wherein the total amount of the builder comprising the zeolite and the sodium polyacrylate (1) was 0.20 parts, and the amount of the sodium polyacrylate (1), as added, was 33.3 parts per 100 parts of the zeolite. After the end of the stirring, water was drained from the white cotton cloth, and further, clay as attached to the pot was removed. Then, 1 L of tap water of 25° C. was added into the pot, and subsequently, the above white cotton cloth was added, and then rinsed at 100 rpm for 2 minutes. This rinsing was carried out two times.

The above operation was repeated three cycles, and then the white cotton cloth was dried while its wrinkles were smoothed with an iron. The whiteness degree (1) of the dried white cotton cloth was measured with a color difference meter. In addition, the whiteness degree (2) of the untested white cotton cloth was also measured with the color difference meter. Thus, the whiteness degree deterioration=(2)–(1) was calculated. The above operation was carried out for 10 pieces of white cotton cloth to calculate the average whiteness degree deterioration (I). Separately, the same operation in the absence of only the solution (d) was carried out as the blank to calculate the average whiteness degree deterioration (II). The recontamination inhibitability was calculated in accordance with the following equation. Results thereof are shown in Table 5.

Recontamination inhibitability=((II)−(I))/(II)×100

EXAMPLE B-2

The recontamination inhibitability was calculated in the same way as of Example B-1 except that the zeolite was replaced with sodium tripolyphosphate (STPP). Results thereof are shown in Table 5.

EXAMPLE B-3

The recontamination inhibitability was calculated in the same way as of Example B-1 except that the sodium polyacrylate (1) was replaced with a sodium polyacrylate (2) as prepared by entirely neutralizing the polyacrylic acid (2) (as obtained in Example A-2) with sodium hydroxide. Results thereof are shown in Table 5.

EXAMPLE B-4

The recontamination inhibitability was calculated in the same way as of Example B-3 except that the zeolite was replaced with sodium tripolyphosphate (STPP). Results thereof are shown in Table 5.

EXAMPLES B-5~6

The recontamination inhibitability was calculated in the same way as of Example B-3 except that the ratio of the zeolite to the sodium polyacrylate (2), as used, was what is shown in Table 5. Results thereof are shown in Table 5.

EXAMPLES B-7~10

The recontamination inhibitability was calculated in the same way as of Example B-1 except that the sodium polyacrylate (1) was replaced with poly(meth)acrylic salts (3)~(6) as prepared by entirely neutralizing the poly(meth) acrylic acids (3)~(6) (as obtained in Examples A-3~6) with sodium hydroxide. Results thereof are shown in Table 5.

EXAMPLE B-11

The recontamination inhibitability was calculated in the same way as of Example B-1 except that the sodium polyacrylate (1) was replaced with the sodium poly(meth) acrylate (7) as obtained in Example A-7. Results thereof are shown in Table 5.

EXAMPLES B-12~14

The recontamination inhibitability was calculated in the same way as of Example B-1 except that the sodium polyacrylate (1) was replaced with poly(meth)acrylic salts (8)~(10) as prepared by entirely neutralizing the poly(meth) acrylic acids (8)~(10) (as obtained in Examples A-8~10) with sodium hydroxide. Results thereof are shown in Table 5.

COMPARATIVE EXAMPLES B-1~3

The recontamination inhibitability was calculated in the same way as of Example B-1 except that the sodium polyacrylate (1) was replaced with comparative poly(meth) acrylic salts (1)~(3) as prepared by entirely neutralizing the comparative poly(meth)acrylic acids (1)~(3) (as obtained in Comparative Examples A-1~3) with sodium hydroxide. Results thereof are shown in Table 6.

COMPARATIVE EXAMPLES B-4~6

The recontamination inhibitability was calculated in the same way as of Example B-1 except that the sodium polyacrylate (1) was replaced with the comparative sodium poly(meth)acrylates (4)~(6) as obtained in Comparative Examples A-4~6. Results thereof are shown in Table 6.

COMPARATIVE EXAMPLE B-7

The recontamination inhibitability was calculated in the same way as of Example B-1 except that the sodium polyacrylate (1) was replaced with a comparative poly (meth)acrylic salt (7) as prepared by entirely neutralizing the comparative poly(meth)acrylic acid (7) (as obtained in Comparative Example A-7) with sodium hydroxide. Results thereof are shown in Table 6.

COMPARATIVE EXAMPLE B-8

The recontamination inhibitability was calculated in the same way as of Example B-1 except that 0.2 parts of zeolite was used alone as the builder. Results thereof are shown in Table 6.

TABLE 5

| | Inorganic builder (1) | | Poly(meth)acrylic salt (2) | | | |
| --- | --- | --- | --- | --- | --- | --- |
| | Sort | Amount added (parts) | Sort | Amount added (parts) | Ratio of (1)/(2) | Recontamination inhibitability |
| Example B-1 | Zeolite | 0.15 | Entire Na salt of polymer of Example A-1 | 0.05 | 100/33.3 | 87 |
| Example B-2 | STPP | 0.15 | Entire Na salt of polymer of Example A-1 | 0.05 | 100/33.3 | 89 |
| Example B-3 | Zeolite | 0.15 | Entire Na salt of polymer of Example A-2 | 0.05 | 100/33.3 | 85 |

TABLE 5-continued

| | Inorganic builder (1) | | Poly(meth)acrylic salt (2) | | | |
|---|---|---|---|---|---|---|
| | Sort | Amount added (parts) | Sort | Amount added (parts) | Ratio of (1)/(2) | Recontamination inhibitability |
| Example B-4 | STPP | 0.15 | Entire Na salt of polymer of Example A-2 | 0.05 | 100/33.3 | 87 |
| Example B-5 | Zeolite | 0.198 | Entire Na salt of polymer of Example A-2 | 0.002 | 100/1.0 | 64 |
| Example B-6 | Zeolite | 0.019 | Entire Na salt of polymer of Example A-2 | 0.181 | 100/953 | 88 |
| Example B-7 | Zeolite | 0.15 | Entire Na salt of polymer of Example A-3 | 0.05 | 100/33.3 | 74 |
| Example B-8 | Zeolite | 0.15 | Entire Na salt of polymer of Example A-4 | 0.05 | 100/33.3 | 68 |
| Example B-9 | Zeolite | 0.15 | Entire Na salt of polymer of Example A-5 | 0.05 | 100/33.3 | 79 |
| Example B-10 | Zeolite | 0.15 | Entire Na salt of polymer of Example A-6 | 0.05 | 100/33.3 | 82 |
| Example B-11 | Zeolite | 0.15 | Polymer of Example A-7 | 0.05 | 100/33.3 | 77 |
| Example B-12 | Zeolite | 0.15 | Entire Na salt of polymer of Example A-8 | 0.05 | 100/33.3 | 86 |
| Example B-13 | Zeolite | 0.15 | Entire Na salt of polymer of Example A-9 | 0.05 | 100/33.3 | 85 |
| Example B-14 | Zeolite | 0.15 | Entire Na salt of polymer of Example A-10 | 0.05 | 100/33.3 | 66 |

TABLE 6

| | Inorganic builder (1) | | Poly(meth)acrylic salt (2) | | | |
|---|---|---|---|---|---|---|
| | Sort | Amount added (parts) | Sort | Amount added (parts) | Ratio of (1)/(2) | Recontamination inhibitability |
| Comparative Example B-1 | Zeolite | 0.15 | Entire Na salt of polymer of Comparative Example A-1 | 0.05 | 100/33.3 | 56 |
| Comparative Example B-2 | Zeolite | 0.15 | Entire Na salt of polymer of Comparative Example A-2 | 0.05 | 100/33.3 | 52 |
| Comparative Example B-3 | Zeolite | 0.15 | Entire Na salt of polymer of Comparative Example A-3 | 0.05 | 100/33.3 | 22 |
| Comparative Example B-4 | Zeolite | 0.15 | Polymer of Comparative Example A-4 | 0.05 | 100/33.3 | 45 |
| Comparative Example B-5 | Zeolite | 0.15 | Polymer of Comparative Example A-5 | 0.05 | 100/33.3 | 37 |
| Comparative Example B-6 | Zeolite | 0.15 | Polymer of Comparative Example A-6 | 0.05 | 100/33.3 | 33 |
| Comparative Example B-7 | Zeolite | 0.15 | Entire Na salt of polymer of Comparative Example A-7 | 0.05 | 100/33.3 | 55 |
| Comparative Example B-8 | Zeolite | 0.20 | No addition | 0 | 100/0 | 5 |

In the following Examples C-1~3 and Comparative Examples C-1~14, the evaluation was made for the inorganic pigment dispersibility and the scale inhibitability of the polymers as obtained in Examples A-1~10 and Comparative Examples A-1~7. As is aforementioned, as to Examples A-1, 8, and 9 among Examples A-1~10, 1~50% of the chain transfer agent is beforehand charged into a reactor, and the balance is gradually supplied, so the use of the resultant polymers for inorganic pigment dispersants or for scale inhibitors is also included in the working examples of the present invention. As to the Example A series other than Examples A-1, 8, and 9, 100% of the chain transfer agent is gradually supplied, so neither the use of the resultant polymers for inorganic pigment dispersants nor for scale inhibitors is included in the working examples of the present invention. As to the polymers resultant from Comparative Examples A-1~7, neither the use thereof for inorganic pigment dispersants nor for scale inhibitors is included in the working examples of the present invention.

EXAMPLE C-1

The poly(meth)acrylic acid polymer (1), as obtained in Example A-1, was neutralized with sodium hydroxide so that the pH would be 9.0. As to the neutralized product as obtained in this way, the inorganic pigment dispersibility and the scale inhibitability were evaluated in the below-mentioned ways. Results thereof are shown in Table 7.

<Inorganic pigment dispersibility>

First, 0.6 g of poly(meth)acrylic salt polymer, 128.0 g of ion-exchanged water, and 300 g of calcium carbonate (inorganic pigment, Super #2000, made by Maruo Calcium Co., Ltd.) were placed into a mayonnaise bottle of 450 ml in capacity, and then liquefied by stirring with a spatula. Next, 150 g of glass beads of 3.5 mm in diameter were added into the mayonnaise bottle, of which the contents were then mixed by shaking with a paint shaker for 30 minutes to disperse the calcium carbonate into the ion-exchanged water, thus obtaining an aqueous dispersion, namely, a slurry, of calcium carbonate of 70 weight % in concentration. The viscosity thereof was measured with a B-type rotating viscometer both just after the production and after 50° C.×30 days.

<Scale inhibitability>

First, 175 g of ion-exchanged water was charged into a glass bottle of 225 ml in capacity, into which 10 g of a 1.56 weight % aqueous calcium chloride dihydrate solution and 1 g of a 0.02 weight % aqueous poly(meth)acrylic salt polymer solution were then mixed. Furthermore, 10 g of a 3 weight % aqueous sodium hydrogencarbonate solution was added and mixed, thus preparing a supersaturated aqueous solution of calcium carbonate of 530 ppm in concentration. This supersaturated aqueous solution was sealed and then heated at 75° C. for 5 hours. After cooling, filtration was carried out with a 0.45 μ membrane filter, and the calcium hardness of the resultant filtrate was analyzed in accordance with JIS K0101. From results thereof, the calcium carbonate scale inhibition rate (%) was determined in accordance with the following calculation formula, thus evaluating the calcium carbonate scale inhibitability.

Calcium carbonate scale inhibition rate (%)=(C−B)/(A−B)×100 wherein:

A is a concentration of calcium carbonate before the heating treatment at 75° C. for 5 hours (=530 ppm);

B is a concentration of calcium carbonate in the filtrate in the case where the 0.02 weight % aqueous poly(meth)acrylic salt polymer solution is not mixed; and C is a concentration of calcium carbonate in the filtrate in the case where the 0.02 weight % aqueous poly(meth)acrylic salt polymer solution is mixed.

EXAMPLES C-2~3

The poly(meth)acrylic acid polymers (8)~(9), as obtained in Examples A-8~9, were neutralized with sodium hydroxide so that the pH would be 9.0. As to the neutralized products as obtained in this way, the inorganic pigment dispersibility and the scale inhibitability were evaluated in the aforementioned ways. Results thereof are shown in Table 7.

COMPARATIVE EXAMPLES C-1~5

The poly(meth)acrylic acid polymers (2)~(6), as obtained in Examples A-2~6, were neutralized with sodium hydroxide so that the pH would be 9.0. As to the neutralized products as obtained in this way, the inorganic pigment dispersibility and the scale inhibitability were evaluated in the aforementioned ways. Results thereof are shown in Table 8.

COMPARATIVE EXAMPLE C-6

The inorganic pigment dispersibility and the scale inhibitability were evaluated in the same way as of Example C-1 except that the sodium polyacrylate (7), as obtained in Example A-7, was used. Results thereof are shown in Table 8.

COMPARATIVE EXAMPLE C-7

The poly(meth)acrylic acid polymer (10), as obtained in Example A-10, was neutralized with sodium hydroxide so that the pH would be 9.0. As to the neutralized product as obtained in this way, the inorganic pigment dispersibility and the scale inhibitability were evaluated in the aforementioned ways. Results thereof are shown in Table 8.

COMPARATIVE EXAMPLES C-8~10

The comparative poly(meth)acrylic acid polymers (1)~(3), as obtained in Comparative Examples A-1~3, were neutralized with sodium hydroxide so that the pH would be 9.0. As to the neutralized products as obtained in this way, the inorganic pigment dispersibility and the scale inhibitability were evaluated in the aforementioned ways. Results thereof are shown in Table 8.

COMPARATIVE EXAMPLES C-11~13

The inorganic pigment dispersibility and the scale inhibitability were evaluated in the same way as of Example C-1 except that the comparative sodium polyacrylates (4)~(6), as obtained in Comparative Examples A-4~6, was used. Results thereof are shown in Table 8.

COMPARATIVE EXAMPLE C-14

The comparative poly(meth)acrylic acid polymer (7), as obtained in Comparative Example A-7, was neutralized with sodium hydroxide so that the pH would be 9.0. As to the neutralized product as obtained in this way, the inorganic pigment dispersibility and the scale inhibitability were evaluated in the aforementioned ways. Results thereof are shown in Table 8.

TABLE 7

| | Poly(meth)acrylic acid (or salt) used | Viscosity of 70% aqueous calcium carbonate dispersion (CP) | | Scale inhibition rate (%) |
|---|---|---|---|---|
| | | Just after production | After 50° C. × 30 days | |
| Example C-1 | Entire Na salt of polymer of Example A-1 | 210 | 220 | 74 |
| Example C-2 | Entire Na salt of polymer of Example A-8 | 230 | 240 | 73 |
| Example C-3 | Entire Na salt of polymer of Example A-9 | 270 | 300 | 71 |

TABLE 8

| | Poly(meth)acrylic acid (or salt) used | Viscosity of 70% aqueous calcium carbonate dispersion (CP) | | Scale inhibition rate (%) |
|---|---|---|---|---|
| | | Just after production | After 50° C. × 30 days | |
| Comparative Example C-1 | Entire Na salt of polymer of Example A-2 | 300 | 360 | 68 |
| Comparative Example C-2 | Entire Na salt of polymer of Example A-3 | 310 | 360 | 65 |
| Comparative Example C-3 | Entire Na salt of polymer of Example A-4 | 320 | 340 | 67 |
| Comparative Example C-4 | Entire Na salt of polymer of Example A-5 | 290 | 330 | 63 |
| Comparative Example C-5 | Entire Na salt of polymer of Example A-6 | 340 | 370 | 25 |
| Comparative Example C-6 | Polymer of Example A-7 | 300 | 330 | 64 |
| Comparative Example C-7 | Entire Na salt of polymer of Example A-10 | 330 | 410 | 51 |
| Comparative Example C-8 | Entire Na salt of polymer of Comparative Example A-1 | 470 | 580 | 43 |
| Comparative Example C-9 | Entire Na salt of polymer of Comparative Example A-2 | 650 | 810 | 40 |
| Comparative Example C-10 | Entire Na salt of polymer of Comparative Example A-3 | 840 | 1130 | 33 |
| Comparative Example C-11 | Polymer of Comparative Example A-4 | 640 | 950 | 36 |
| Comparative Example C-12 | Polymer of Comparative Example A-5 | 770 | 1260 | 37 |
| Comparative Example C-13 | Polymer of Comparative Example A-6 | 1280 | 1700 | 25 |
| Comparative Example C-14 | Entire Na salt of polymer of Comparative Example A-7 | 510 | 630 | 48 |

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents

What is claimed is:

1. A detergent builder, comprising a poly(meth)acrylic acid (or salt) polymer which gives a product (A×B) of 18,000 or more from the gelation resistance (A) and the chelating ability (B).

2. A detergent builder according to claim 1, wherein the poly(meth)acrylic acid (or salt) polymer has a ratio of the weight-average molecular weight to the number-average molecular weight in the range of 1.5~2.8.

3. A detergent builder according to claim 2, wherein the poly(meth)acrylic acid (or salt) polymer is derived from a monomer component including a (meth)acrylic acid (or salt) monomer in a ratio of 90 weight % or more, and has a weight-average molecular weight of 1,000~100,000.

4. A detergent builder according to claim 3, wherein the poly(meth)acrylic acid (or salt) polymer contains a P atom in its molecule.

5. A detergent builder according to claim 4, comprising 1~1,000 weight parts of the poly(meth)acrylic acid (or salt) polymer and 100 weight parts of inorganic builder.

6. A poly(meth)acrylic acid (or salt) polymer, obtained by a process including the step of polymerizing a monomer component including a major proportion of (meth)acrylic acid (or salt) in the presence of a chain transfer agent and a polymerization initiator in an aqueous medium;

with the polymer being characterized in that:
the ratio by weight of (total amount of monomer component, chain transfer agent, and polymerization initiator) to (total amount of aqueous medium) is in the range of 48:52~66:34;
weight % or more of the total amount of the aqueous medium and 1~50 weight % of the total amount of the chain transfer agent are beforehand charged into a reactor; and
the polymerization is carried out within the reaction temperature range of 50~120° C. while 70 weight % or more of the total amount of the monomer component, 50 weight % or more of the total amount of the chain transfer agent, and 80 weight % or more of the total amount of the polymerization initiator are gradually supplied to the reaction system having a temperature of 50~120° C.

7. A poly(meth)acrylic acid (or salt) polymer according to claim 6, which gives a product (A×B) of 18,000 or more from the gelation resistance (A) and the chelating ability (B), and has a ratio of the weight-average molecular weight to the number-average molecular weight in the range of 1.5~2.8.

8. An inorganic pigment dispersant, comprising the poly(meth)acrylic acid (or salt) polymer as recited in claim 6.

9. A scale inhibitor, comprising the poly(meth)acrylic acid (or salt) polymer as recited in claim 6.

* * * * *